United States Patent
Wajs

(10) Patent No.: US 9,495,751 B2
(45) Date of Patent: *Nov. 15, 2016

(54) PROCESSING MULTI-APERTURE IMAGE DATA

(75) Inventor: Andrew Augustine Wajs, Haarlem (NL)

(73) Assignee: DUAL APERTURE INTERNATIONAL CO. LTD., Yuseong-Gu, Daejeon (KR)

( * ) Notice: Subject to any disclaimer, the term of this patent is extended or adjusted under 35 U.S.C. 154(b) by 232 days.

This patent is subject to a terminal disclaimer.

(21) Appl. No.: 13/579,568

(22) PCT Filed: Feb. 19, 2010

(86) PCT No.: PCT/EP2010/052154
§ 371 (c)(1),
(2), (4) Date: Oct. 15, 2012

(87) PCT Pub. No.: WO2011/101036
PCT Pub. Date: Aug. 25, 2011

(65) Prior Publication Data
US 2013/0033578 A1    Feb. 7, 2013

(51) Int. Cl.
*H04N 13/02*     (2006.01)
*G06T 7/00*      (2006.01)
(Continued)

(52) U.S. Cl.
CPC .......... *G06T 7/0065* (2013.01); *H04N 5/2355* (2013.01); *H04N 5/23212* (2013.01); *G06T 2207/10048* (2013.01)

(58) Field of Classification Search
CPC ........ H04N 13/04; H04N 5/225; H04N 5/33; H04N 5/23219; H04N 5/23212; H04N 5/23293; H04N 9/045; H04N 9/083; H04N 13/02; G06K 9/40; G06K 9/36; G06K 9/00228; H01L 27/00; G03B 13/34; G06T 2207/10048; G06T 2207/20056; G06T 2207/10024; G06T 7/0069; G02B 7/365; G02B 27/0075; G02B 27/58; G02B 5/005

USPC ....... 348/46, 265, 336; 250/332, 208.1, 226; 257/432

See application file for complete search history.

(56) References Cited

U.S. PATENT DOCUMENTS 2,921,509 A * 1/1960 Freund .......................... 396/334
4,965,840 A   10/1990 Subbarao
(Continued)

FOREIGN PATENT DOCUMENTS

EP    0318188 A2    5/1989
JP    08140116 A    5/1996
(Continued)

OTHER PUBLICATIONS

International Search Report, mailed Aug. 17, 2010 in connection with International Patent Application No. PCT/EP2010/052154.
(Continued)

*Primary Examiner* — Chikaodili E Anyikire
*Assistant Examiner* — Dramos I Kalapodas
(74) *Attorney, Agent, or Firm* — Steven M. Koehler; Westman, Champlin & Koehler, P.A.

(57) ABSTRACT

A method and a system for processing multi-aperture image data are described, wherein the method comprises: capturing image data associated with one or more objects by simultaneously exposing an image sensor in an imaging system to spectral energy associated with at least a first part of the electromagnetic spectrum using at least a first aperture and to spectral energy associated with at least a second part of the electromagnetic spectrum using at least a second and third aperture; generating first image data associated with said first part of the electromagnetic spectrum and second image data associated with said second part of the electromagnetic spectrum; and, generating depth information associated with said captured image on the basis displacement information in said second image data, preferably on the basis of displacement information in an auto-correlation function of the high-frequency image data associated with said second image data.

18 Claims, 15 Drawing Sheets

(51) Int. Cl.
  *H04N 5/232* (2006.01)
  *H04N 5/235* (2006.01)
  *G03B 41/08* (2006.01)
  *H01L 27/00* (2006.01)

(56) References Cited

U.S. PATENT DOCUMENTS

| | | | | |
|---|---|---|---|---|
| 5,814,803 | A * | 9/1998 | Olmstead | G06K 7/10702 235/454 |
| 6,363,220 | B1 * | 3/2002 | Ide | G02B 7/08 348/345 |
| 7,224,540 | B2 * | 5/2007 | Olmstead | G06K 7/10702 235/462.41 |
| 7,372,642 | B2 * | 5/2008 | Rohaly | H04N 13/0217 348/218.1 |
| 2001/0033326 | A1 * | 10/2001 | Goldstein et al. | 348/42 |
| 2002/0149691 | A1 * | 10/2002 | Pereira | G01B 11/24 348/335 |
| 2002/0171740 | A1 * | 11/2002 | Seo | H04N 13/0257 348/207.99 |
| 2006/0285741 | A1 * | 12/2006 | Subbarao | G06T 5/50 382/154 |
| 2007/0024614 | A1 | 2/2007 | Tam et al. | |
| 2007/0102622 | A1 * | 5/2007 | Olsen | G02B 7/04 250/208.1 |
| 2007/0189750 | A1 * | 8/2007 | Wong | H04N 5/23212 396/121 |
| 2008/0013943 | A1 * | 1/2008 | Rohaly | G03B 35/00 396/333 |
| 2008/0055400 | A1 * | 3/2008 | Schechterman et al. | 348/51 |
| 2008/0252882 | A1 * | 10/2008 | Kesterson | G02B 5/208 356/300 |
| 2008/0297648 | A1 | 12/2008 | Furuki et al. | |
| 2008/0308712 | A1 * | 12/2008 | Ono | G02B 5/26 250/208.1 |
| 2009/0015681 | A1 * | 1/2009 | Pipkorn | H04N 5/23219 348/208.12 |
| 2009/0015979 | A1 | 1/2009 | Fukano | |
| 2009/0102956 | A1 * | 4/2009 | Georgiev | 348/315 |
| 2009/0115780 | A1 | 5/2009 | Varekamp et al. | |
| 2009/0159799 | A1 | 6/2009 | Copeland | |
| 2009/0268895 | A1 * | 10/2009 | Emerson | H04M 3/54 379/212.01 |
| 2010/0066854 | A1 * | 3/2010 | Mather | G02B 5/005 348/222.1 |
| 2010/0188532 | A1 * | 7/2010 | Kusaka | H04N 9/045 348/240.99 |
| 2010/0225755 | A1 * | 9/2010 | Tamaki et al. | 348/78 |
| 2011/0064327 | A1 * | 3/2011 | Dagher et al. | 382/263 |
| 2011/0069189 | A1 * | 3/2011 | Venkataraman | H01L 27/14618 348/218.1 |
| 2011/0211106 | A1 * | 9/2011 | Marks et al. | 348/340 |
| 2012/0008023 | A1 | 1/2012 | Wajs | |
| 2012/0154596 | A1 | 6/2012 | Wajs | |
| 2012/0194650 | A1 * | 8/2012 | Izadi | H04N 13/0271 348/47 |
| 2012/0281072 | A1 * | 11/2012 | Georgiev et al. | 348/49 |
| 2013/0016220 | A1 * | 1/2013 | Brown | 348/164 |
| 2013/0033579 | A1 | 2/2013 | Wajs | |
| 2013/0107010 | A1 * | 5/2013 | Hoiem et al. | 348/47 |
| 2013/0176396 | A1 * | 7/2013 | Cohen et al. | 348/46 |
| 2013/0278802 | A1 * | 10/2013 | Attar | H04N 5/2226 348/296 |

FOREIGN PATENT DOCUMENTS

| | | |
|---|---|---|
| JP | 2008252639 | 10/2008 |
| JP | 2008268868 A | 11/2008 |
| JP | 2009232348 | 10/2009 |
| WO | 02059692 | 8/2002 |
| WO | 2009097552 | 8/2009 |
| WO | 2010081556 | 7/2010 |
| WO | 2011023224 | 3/2011 |

OTHER PUBLICATIONS

Article Kazuya Kodama et al, All-in-Focus Image Generation by Merging Multiple Differently Focused Images in Three-Dimensional Frequency Domain, Advances in Multimedia Information Processing, PCM Science, pp. 303-314, Jan. 1, 2005.

Office Action for Chinese Patent Application No. 201080066095.7, issued on Dec. 8, 2014.

Notice of Reasons for Rejection for corresponding Japanese Application No. 2012-553197 drafted Oct. 24, 2013.

Notification of the First Office Action for corresponding foreign Chinese Patent Application No. 201080066092.3, dated Jul. 3, 2015 from the State Intellectual Propety Office of the People's Republic of China.

Office Action for related U.S. Appl. No. 13/579,569 dated Apr. 22, 2015.

Final Office Action for related U.S. Appl. No. 13/579,569 dated Oct. 14, 2015.

Communication for corresponding foreign appiication EP 10704372.1-1902, dated Nov. 16, 2015.

Office Action from U.S. Appl. No. 13/579,569, dated Jun. 16, 2016.

* cited by examiner

PROCESSING MULTI-APERTURE IMAGE DATA

PRIORITY CLAIM(S) AND/OR CROSS-REFERENCE(S) TO RELATED APPLICATION(S)

This application is a national stage application under 35 U.S.C. §371 of PCT/EP2010/052154, filed Feb. 19, 2010, published as WO 2011/101036A1 on Aug. 25, 2011, which application and publication are incorporated herein by reference and made a part hereof in its entirety, and the benefit of priority of which is claimed herein.

FIELD OF THE INVENTION

The invention relates to processing multi-aperture image data, and, in particular, though not exclusively, to a method and a system for processing multi-aperture image data, an image processing apparatus for use in such system and a computer program product using such method.

BACKGROUND OF THE INVENTION

The increasing use of digital photo and video imaging technology in various fields of technology such as mobile telecommunications, automotive, and biometrics demands the development of small integrated cameras providing image quality which match or at least approximate the image quality as provided by single-lens reflex cameras. The integration and miniaturization of digital camera technology however put serious constraints onto the design of the optical system and the image sensor, thereby negatively influencing the image quality produced by the imaging system. Spacious mechanical focus and aperture setting mechanisms are not suitable for use in such integrated camera applications. Hence, various digital camera capturing and processing techniques are developed in order to enhance the imaging quality of imaging systems based on fixed focus lenses.

PCT applications with international patent application numbers PCT/EP2009/050502 and PCT/EP2009/060936, which are hereby incorporated by reference, describe ways to extend the depth of field of a fixed focus lens imaging system through use of an optical system which combines both color and infrared imaging techniques. The combined use of an image sensor which is adapted for imaging both in the color and the infrared spectrum and a wavelength selective multi-aperture aperture allows extension of depth of field and increase of the ISO speed for digital cameras with a fixed focus lens in a simple and cost effective way. It requires minor adaptations to known digital imaging systems thereby making this process especially suitable for mass production.

Although the use of a multi-aperture imaging system provides substantial advantages over known digital imaging systems, such system may not yet provide same functionality as provided in single-lens reflex cameras. In particular, it would be desirable to have a fixed-lens multi-aperture imaging system which allows adjustment of camera parameters such as adjustable depth of field and/or adjustment of the focus distance. Moreover, it would be desirable to provide such multi-aperture imaging systems with 3D imaging functionality similar to known 3D digital cameras. Hence, there is need in the art for methods and systems allowing which may provide multi-aperture imaging systems enhanced functionality.

SUMMARY OF THE INVENTION

It is an object of the invention to reduce or eliminate at least one of the drawbacks known in the prior art. In a first aspect the invention may relate to a method for processing multi-aperture image data, wherein the method may comprise:

capturing image data associated with one or more objects by simultaneously exposing an image sensor in an imaging system to spectral energy associated with at least a first part of the electromagnetic spectrum using at least a first aperture and to spectral energy associated with at least a second part of the electromagnetic spectrum using at least a second and third aperture; generating first image data associated with said first part of the electromagnetic spectrum and second image data associated with said second part of the electromagnetic spectrum; and, generating depth information associated with said captured image on the basis displacement information in said second image data, preferably on the basis of displacement information in an auto-correlation function of the high-frequency image data associated with said second image data. Hence, on the basis of multi-aperture image data, i.e. image data produced a multi-aperture imaging system, the method allows generation of depth information, which relates objects in an image to an object to camera distance. Using the depth information, a depth map associated with a captured image may be generated. The distance information and the depth map allows implementation of image processing functions which may provide a fixed lens imaging system enhanced functionality.

In one embodiment said at least second and third apertures may be positioned with respect to each other such that high-frequency information in said second image data is displaced a function of the distance between an object and said imaging system. Hence, the multi-aperture configuration introduces displacement information in the image data, which may be used for generating depth information.

In another embodiment, the method may comprise: identifying one or more peaks in one or more areas of said auto-correlated second high-frequency image data, said on or more peaks being associated with edges of imaged objects; on the basis of said one or more identified peaks determining a distance between said imaging system and at least one of said objects. Using the autocorrelation function, the displacement information in the second image data may be accurately determined.

In a further embodiment, the method may comprise: identifying a single peak associated with an edge of an imaged object that is in focus and/or identifying double or multiple peaks associated with an imaged object that is out-of-focus; relating said single peaks and/or the distance between peaks in said double or multiple peaks to a distance between said imaging system and at least one of said objects by using a predetermined depth function.

In yet a further embodiment, said first part of the electromagnetic spectrum may be associated with at least part of the visible spectrum and/or said second part of the electromagnetic spectrum may be associated with at least part of the invisible spectrum, preferably the infrared spectrum. The use of the infrared spectrum allows efficient use of the sensitivity of the image sensor thereby allowing significant improvement of the signal to noise ratio. Simultaneously capturing an color image and an infrared image using a wavelength-selective multi-aperture diaphragm allows the generation of color images which are enhanced with the sharpness information in the infrared image.

In one embodiment, the method may comprise: determining said high-frequency second image data by subjecting said second image data to a high-pass filter; and/or eliminating displacements in said high-frequency second image data generated by said second high—by said second and third apertures.

In another embodiment, the method comprises: generating a depth map associated with at least part of said captured image by associating displacement information in said second image data, preferably displacement information in an auto-correlation function of the high-frequency image data associated with said second image data, with a distance between said imaging system and at least one of said objects. In this embodiment, a depth map for a captured image may be generated. The depth map associates each pixel data or each groups of pixel data in an image to a distance value.

In one variant, the method comprises: generating at least one image for use in stereoscopic viewing by shifting pixels in said first image data on the basis of said depth information. Hence, images may be generated for stereoscopic viewing. These images may be generated on the basis of an image captured by the multi-aperture imaging system and its associated depth map. The captured image may be enhanced with high-frequency infrared information.

In another variant, the method may comprise: providing at least one threshold distance or at least one distance range; on the basis of said depth information, identifying in said high-frequency second image data one or more areas associated with distances larger or smaller than said threshold distance or identifying in said high-frequency second image data one or more areas associated with distances within said at least one distance range; setting the high-frequency components in said identified one or more areas of said second high-frequency image data to zero or to one or more predetermined values; adding said second high-frequency image data to said first image data. In this variant, the depth information may thus provide control of the depth of field.

In yet another variant, the method may comprise:
providing at least one focus distance; on the basis of said depth information, identifying in said high-frequency second image data one or more areas associated with a distance substantially equal to said at least one focus distance; setting the high-frequency second image data in areas other than said identified one or more areas to zero or to one or more predetermined values; adding said high-frequency second image data to said first image data. In this embodiment, the depth information may thus provide control of the focus point.

In a further variant, the method may comprise: processing said captured image using an image processing function, wherein one or more image process function parameters are depending on said depth information, preferably processing said second image data by applying a filter, wherein one or more filter parameters vary in accordance with said depth information. Hence, the depth information may also be used in conventional image processing steps such as filtering.

In one embodiment, the method may comprise: providing at least one threshold peak width and/or peak height threshold; identifying in said auto-correlated second high-frequency image data areas comprising one or more peaks having a peak width larger than said threshold peak width and/or areas comprising one or more peaks having a peak height smaller than said peak height threshold; setting the high-frequency components in said identified one or more areas of said second high-frequency image data in accordance to a masking function; adding said second high-frequency image data to said first image data.

In another embodiment, the method may comprise: identifying one or more areas in said captured image using an edge-detection algorithm; generating said depth information in said one or more identified areas.

In another aspect, the invention may relate to a multi-aperture system, preferably a wavelength-selective multi-aperture system, more preferably a diaphragm comprising a wavelength-selective multi-aperture system, wherein said multi-aperture system may comprise: at least a first aperture for controlling exposure of an image sensor to at least a first part of the electromagnetic spectrum; at least a second and third aperture for controlling exposure of an image sensor in an imaging system to at least a second part of the electromagnetic spectrum; second image data associated with said second part of the electromagnetic spectrum, wherein said second and third apertures are positioned with respect to each other such that high-frequency information in said second image data is displaced as a function of the distance between an object and said imaging system.

In one embodiment the dimensions of said first aperture may be substantially larger than the dimensions of said second and third aperture.

In a further embodiment, said first aperture may be formed as an opening in an opaque thin-film on a transparent substrate or lens, said opaque thin-film blocking at least both first and second part of said electromagnetic spectrum In yet a further embodiment, said at least second and third aperture may be formed as openings in a thin-film filter located within said first aperture, said thin-film filter blocking radiation in said second part of the electromagnetic spectrum and transmitting radiation is said first part of the electromagnetic spectrum.

In another embodiment, said at least second and third multi apertures may be located as multiple small infrared apertures along the periphery of said first aperture.

In another aspect, the invention may relate to a multi-aperture imaging system, comprising: an image sensor; an optical lens system; a wavelength-selective multi-aperture configured for simultaneously exposing said image sensor to spectral energy associated with at least a first part of the electromagnetic spectrum using at least a first aperture and to spectral energy associated with at least a second part of the electromagnetic spectrum using at least a second and third aperture; a first processing module for generating first image data associated with said first part of the electromagnetic spectrum and second image data associated with said second part of the electromagnetic spectrum; and, a second processing module for generating depth information associated with said captured image on the basis displacement information in said second image data, preferably on the basis of displacement information in an auto-correlation function of the high-frequency image data associated with said second image data.

In yet a further aspect, invention may related to a method of determining a depth function using multi-aperture image data, comprising: capturing one or more images of one or more objects at different predetermined object-to-camera distances, each image being captured by simultaneously exposing an image sensor in an imaging system to spectral energy associated with at least a first part of the electromagnetic spectrum using at least a first aperture and to spectral energy associated with at least a second part of the electromagnetic spectrum using at least a second and third aperture; for at least part of said captured images, generating second image data associated with said second part of the electromagnetic spectrum; generating a depth function by relating displacement information in said second image data, preferably displacement information in an auto-correlation function of the high-frequency image data associated with said second image data, to said predetermined object-to-camera distances.

The invention may also relate to a signal processing module, comprising: an input for receiving first captured image data associated with said first part of the electromagnetic spectrum and second captured image data associated with said second part of the electromagnetic spectrum; at least one high-pass filter for generating high-frequency data associated with said first and/or second captured image data; an autocorrelation processor for determining the autocorrelation function of said high-frequency second image data; a memory comprising a depth function, said depth function relating displacement information in said second image data, preferably displacement information in an auto-correlation function of the high-frequency image data associated with said second image, to an object to camera distance; and, a depth information processor for generating depth information on the basis said depth function and displacement information in said second image data, preferably displacement information in an auto-correlation function of the high-frequency image data associated with said second image.

The invention may also relate to a digital camera, preferably digital camera for use in a mobile terminal, comprising a signal processing module as described above and/or a multi-aperture imaging system as described above.

The invention may also relate to a computer program product for processing image data, said computer program product comprising software code portions configured for, when run in the memory of a computer system, executing the method steps according to any of the method as described above.

The invention will be further illustrated with reference to the attached drawings, which schematically will show embodiments according to the invention. It will be understood that the invention is not in any way restricted to these specific embodiments.

DETAILED DESCRIPTION

Figure 1:
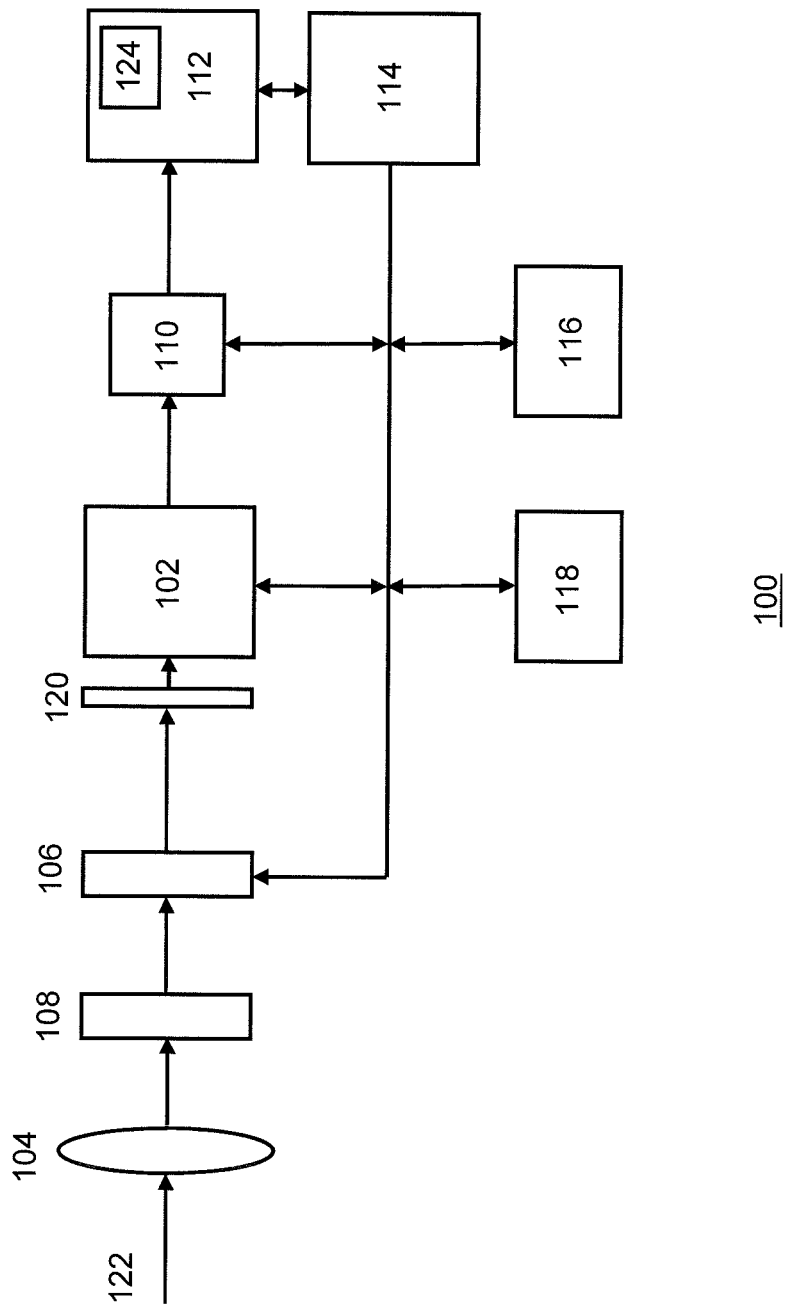
FIG. 1 depicts a multi-aperture imaging system according to one embodiment of the invention.

FIG. 1 illustrates a multi-aperture imaging system 100 according to one embodiment of the invention. The imaging system may be part of a digital camera or integrated in a mobile phone, a webcam, a biometric sensor, image scanner or any other multimedia device requiring image-capturing functionality. The system depicted in FIG. 1 comprises an image sensor 102, a lens system 104 for focusing objects in a scene onto the imaging plane of the image sensor, a shutter 106 and an aperture system 108 comprising a predetermined number apertures for allowing light (electromagnetic radiation) of a first part, e.g. a visible part, and at least a second part of the EM spectrum, e.g. a non-visible part such as part of the infrared) of the electromagnetic (EM) spectrum to enter the imaging system in a controlled way.

The multi-aperture system 108, which will be discussed hereunder in more detail, is configured to control the exposure of the image sensor to light in the visible part and, optionally, the invisible part, e.g. the infrared part, of the EM spectrum. In particular, the multi-aperture system may define at a least first aperture of a first size for exposing the image sensor with a first part of the EM spectrum and at least a second aperture of a second size for exposing the image sensor with a second part of the EM spectrum. For example, in one embodiment the first part of the EM spectrum may relate to the color spectrum and the second part to the infrared spectrum. In another embodiment, the multi-aperture system may comprise a predetermined number of apertures each designed to expose the image sensor to radiation within a predetermined range of the EM spectrum.

The exposure of the image sensor to EM radiation is controlled by the shutter 106 and the apertures of the multi-aperture system 108. When the shutter is opened, the aperture system controls the amount of light and the degree of collimation of the light exposing the image sensor 102. The shutter may be a mechanical shutter or, alternatively, the shutter may be an electronic shutter integrated in the image sensor. The image sensor comprises rows and columns of photosensitive sites (pixels) forming a two dimensional pixel array. The image sensor may be a CMOS (Complimentary Metal Oxide Semiconductor) active pixel sensor or a CCD (Charge Coupled Device) image sensor. Alternatively, the image sensor may relate to other Si (e.g. a-Si), III-V (e.g. GaAs) or conductive polymer based image sensor structures.

When the light is projected by the lens system onto the image sensor, each pixel produces an electrical signal, which is proportional to the electromagnetic radiation (energy) incident on that pixel. In order to obtain color information and to separate the color components of an image which is projected onto the imaging plane of the image sensor, typically a color filter array 120 (CFA) is interposed between the lens and the image sensor. The color filter array may be integrated with the image sensor such that each pixel of the image sensor has a corresponding pixel filter. Each color filter is adapted to pass light of a predetermined color band into the pixel. Usually a combination of red, green and blue (RGB) filters is used, however other filter schemes are also possible, e.g. CYGM (cyan, yellow, green, magenta), RGBE (red, green, blue, emerald), etc.

Each pixel of the exposed image sensor produces an electrical signal proportional to the electromagnetic radiation passed through the color filter associated with the pixel. The array of pixels thus generates image data (a frame) representing the spatial distribution of the electromagnetic energy (radiation) passed through the color filter array. The signals received from the pixels may be amplified using one or more on-chip amplifiers. In one embodiment, each color channel of the image sensor may be amplified using a separate amplifier, thereby allowing to separately control the ISO speed for different colors.

Further, pixel signals may be sampled, quantized and transformed into words of a digital format using one or more Analog to Digital (A/D) converters 110, which may be integrated on the chip of the image sensor. The digitized image data are processed by a digital signal processor 112 (DSP) coupled to the image sensor, which is configured to perform well known signal processing functions such as interpolation, filtering, white balance, brightness correction, data compression techniques (e.g. MPEG or JPEG type techniques). The DSP is coupled to a central processor 114, storage memory 116 for storing captured images and a program memory 118 such as EEPROM or another type of nonvolatile memory comprising one or more software programs used by the DSP for processing the image data or used by a central processor for managing the operation of the imaging system.

Further, the DSP may comprise one or more signal processing functions 124 configured for obtaining depth information associated with an image captured by the multi-aperture imaging system. These signal processing functions may provide a fixed-lens multi-aperture imaging system with extended imaging functionality including variable DOF and focus control and stereoscopic 3D image viewing capabilities. The details and the advantages associated with these signal processing functions will be discussed hereunder in more detail.

As described above, the sensitivity of the imaging system is extended by using infrared imaging functionality. To that end, the lens system may be configured to allow both visible light and infrared radiation or at least part of the infrared radiation to enter the imaging system. Filters in front of lens system are configured to allow at least part of the infrared radiation entering the imaging system. In particular, these filters do not comprise infrared blocking filters, usually referred to as hot-mirror filters, which are used in conventional color imaging cameras for blocking infrared radiation from entering the camera.

Hence, the EM radiation 122 entering the multi-aperture imaging system may thus comprise both radiation associated with the visible and the infrared parts of the EM spectrum thereby allowing extension of the photo-response of the image sensor to the infrared spectrum.

Figure 2:
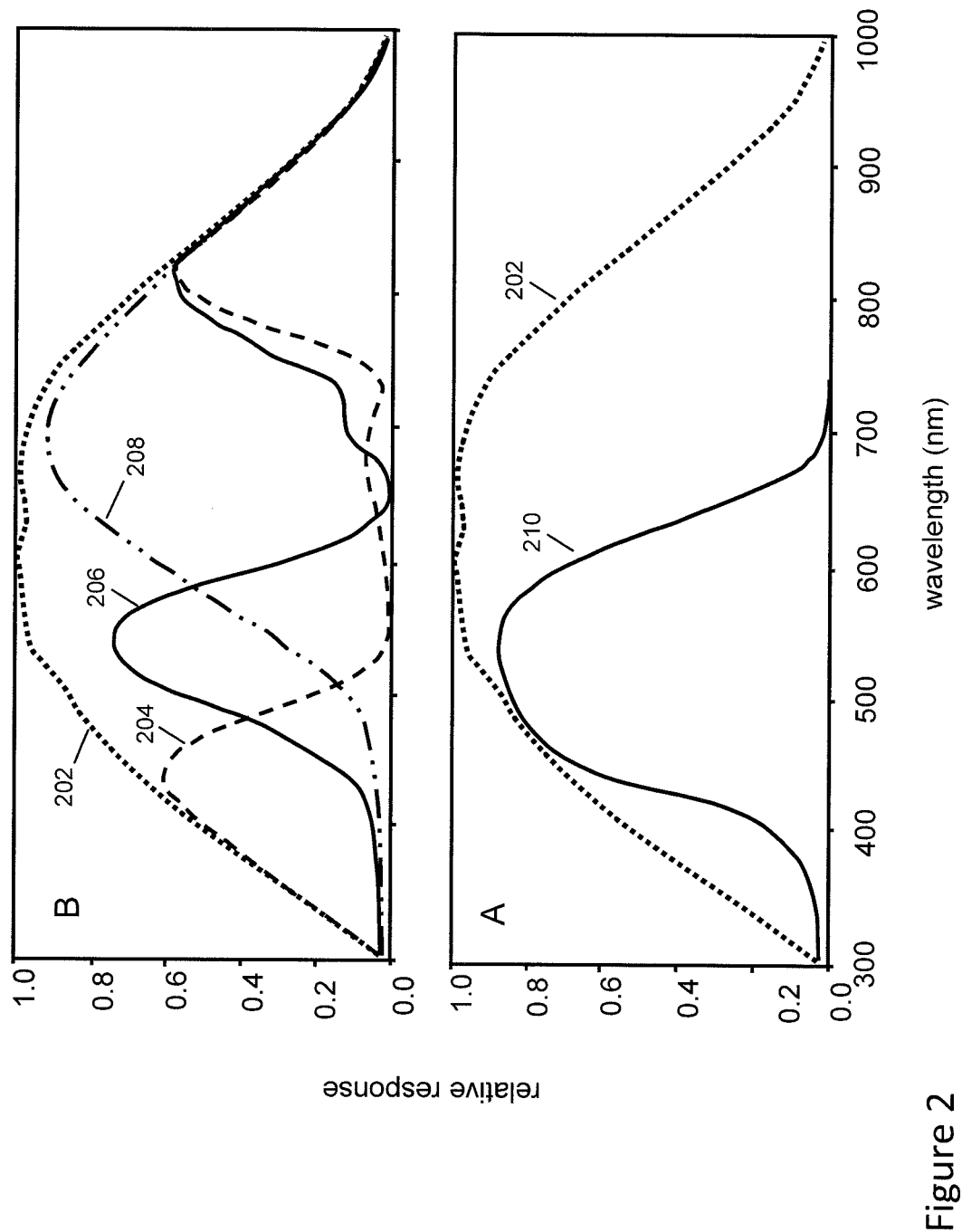
FIG. 2 depicts color responses of a digital camera.
Figure 3:
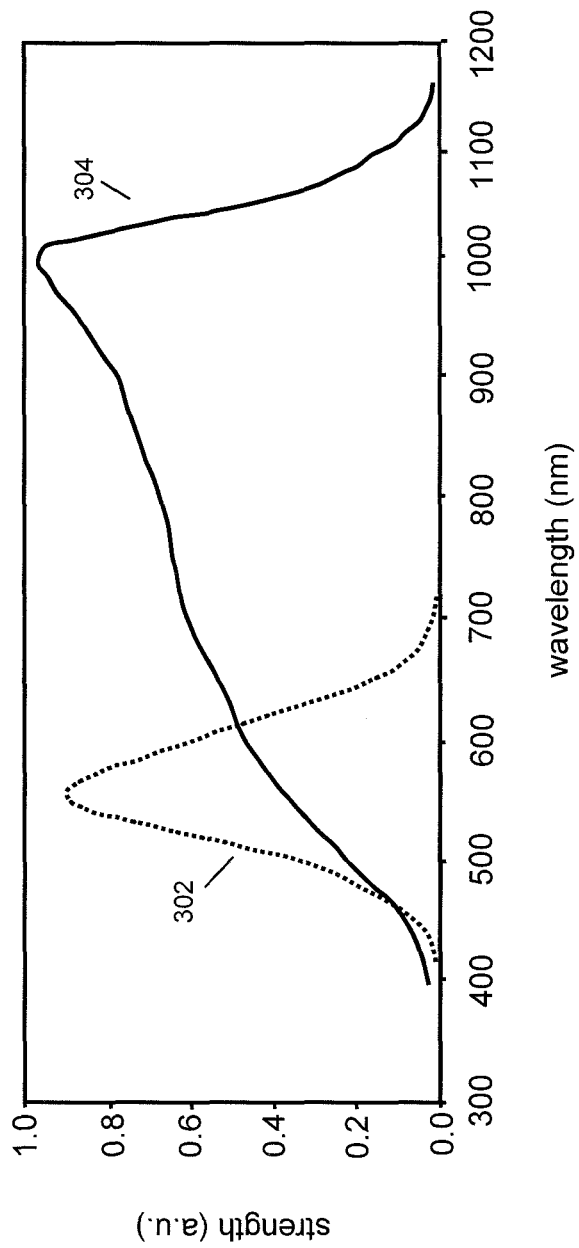
FIG. 3 depicts the response of a hot mirror filter and the response of Silicon.

The effect of (the absence of) an infrared blocking filter on a conventional CFA color image sensor is illustrated in FIG. 2-3. In FIG. 2A and 2B, curve 202 represents a typical color response of a digital camera without an infrared blocking filter (hot mirror filter). Graph A illustrates in more detail the effect of the use of a hot mirror filter. The response of the hot mirror filter 210 limits the spectral response of the image sensor to the visible spectrum thereby substantially limiting the overall sensitivity of the image sensor. If the hot mirror filter is taken away, some of the infrared radiation will pass through the color pixel filters. This effect is depicted by graph B illustrating the photo-responses of conventional color pixels comprising a blue pixel filter 204, a green pixel filter 206 and a red pixel filter 208. The color pixel filters, in particular the red pixel filter, may (partly) transmit infrared radiation so that a part of the pixel signal may be attributed to infrared radiation. These infrared contributions may distort the color balance resulting into an image comprising so-called false colors.

FIG. 3 depicts the response of the hot mirror filter 302 and the response of Silicon 304 (i.e. the main semiconductor component of an image sensor used in digital cameras). These responses clearly illustrates that the sensitivity of a Silicon image sensor to infrared radiation is approximately four times higher than its sensitivity to visible light.

In order to take advantage of the spectral sensitivity provided by the image sensor as illustrated by FIGS. 2 and 3, the image sensor 102 in the imaging system in FIG. 1 may be a conventional image sensor. In a conventional RGB sensor, the infrared radiation is mainly sensed by the red pixels. In that case, the DSP may process the red pixel signals in order to extract the low-noise infrared information therein. This process will be described hereunder in more detail. Alternatively, the image sensor may be especially configured for imaging at least part of the infrared spectrum. The image sensor may comprise for example one or more infrared (I) pixels in conjunction with color pixels thereby allowing the image sensor to produce a RGB color image and a relatively low-noise infrared image.

An infrared pixel may be realized by covering a photo-site with a filter material, which substantially blocks visible light and substantially transmits infrared radiation, preferably infrared radiation within the range of approximately 700 through 1100 nm. The infrared transmissive pixel filter may be provided in an infrared/color filter array (ICFA) may be realized using well known filter materials having a high transmittance for wavelengths in the infrared band of the spectrum, for example a black polyimide material sold by Brewer Science under the trademark "DARC 400".

Methods to realized such filters are described in US2009/0159799. An ICFA may contain blocks of pixels, e.g. 2×2 pixels, wherein each block comprises a red, green, blue and infrared pixel. When being exposed, such image ICFA color image sensor may produce a raw mosaic image comprising both RGB color information and infrared information. After processing the raw mosaic image using a well-known demosaicking algorithm, a RGB color image and an infrared image may obtained. The sensitivity of such ICFA image color sensor to infrared radiation may be increased by increasing the number of infrared pixels in a block. In one configuration (not shown), the image sensor filter array may for example comprise blocks of sixteen pixels, comprising four color pixels RGGB and twelve infrared pixels.

Instead of an ICFA image color sensor, in another embodiment, the image sensor may relate to an array of photo-sites wherein each photo-site comprises a number of stacked photodiodes well known in the art. Preferably, such stacked photo-site comprises at least four stacked photodiodes responsive to at least the primary colors RGB and infrared respectively. These stacked photodiodes may be integrated into the Silicon substrate of the image sensor.

Figure 4:
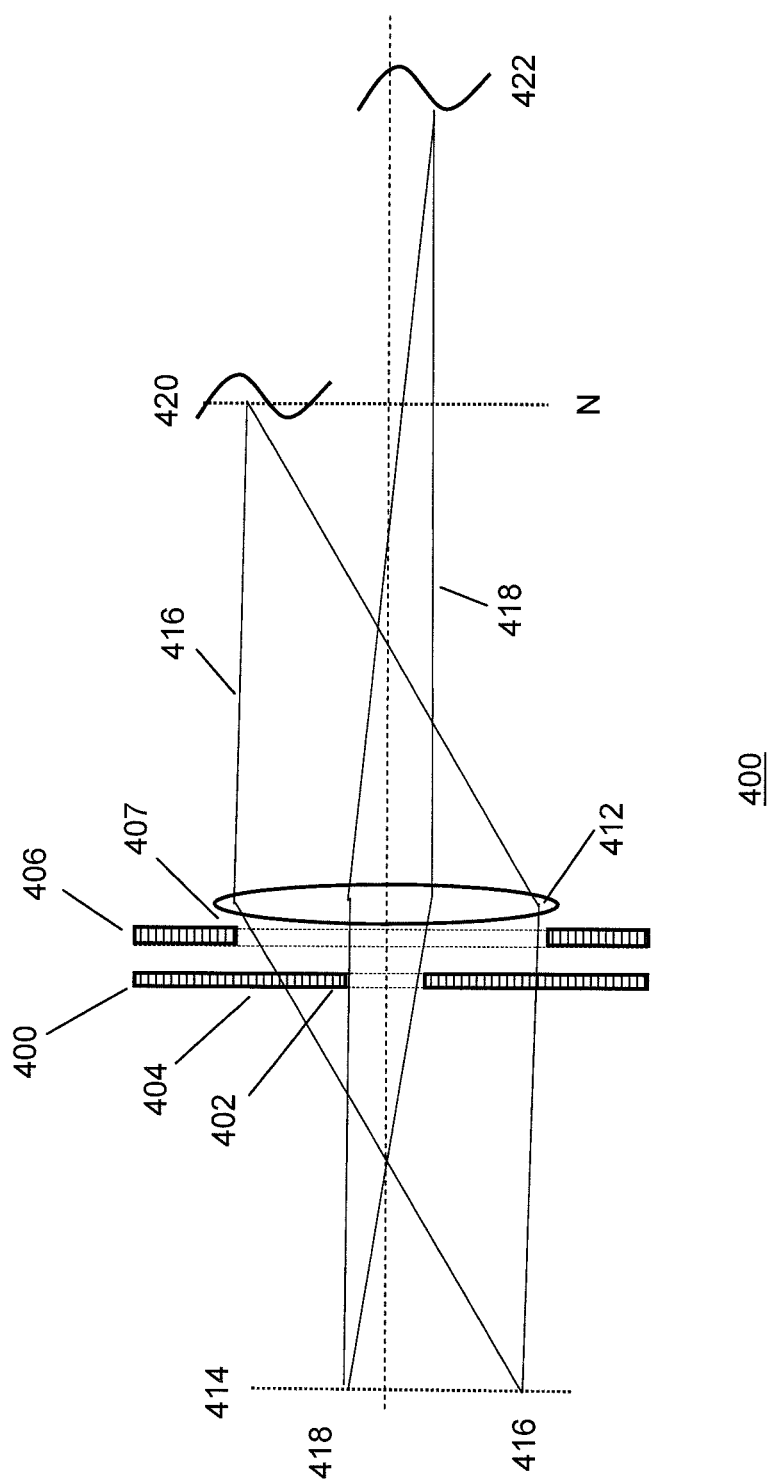
FIG. 4 depicts a schematic optical system using a multi-aperture system.

The multi-aperture system, e.g. a multi-aperture diaphragm, may be used to improve the depth of field (DOF) of the camera. The principle of such multi-aperture system 400 is illustrated in FIG. 4. The DOF determines the range of distances from the camera that are in focus when the image is captured. Within this range the object is acceptable sharp. For moderate to large distances and a given image format, DOF is determined by the focal length of the lens N, the f-number associated with the lens opening (the aperture), and the object-to-camera distance s. The wider the aperture (the more light received) the more limited the DOF.

Visible and infrared spectral energy may enter the imaging system via the multi-aperture system. In one embodiment, such multi-aperture system may comprise a filter-coated transparent substrate with a circular hole 402 of a predetermined diameter D1. The filter coating 404 may transmit visible radiation and reflect and/or absorb infrared radiation. An opaque covering 406 may comprise a circular opening with a diameter D2, which is larger than the diameter D1 of the hole 402. The cover may comprise a thin-film coating which reflects both infrared and visible radiation or, alternatively, the cover may be part of an opaque holder for holding and positioning the substrate in the optical system. This way the multi-aperture system comprises multiple wavelength-selective apertures allowing controlled exposure of the image sensor to spectral energy of different parts of the EM spectrum. Visible and infrared spectral energy passing the aperture system is subsequently projected by the lens 412 onto the imaging plane 414 of an image sensor comprising pixels for obtaining image data associated with the visible spectral energy and pixels for obtaining image data associated with the non-visible (infrared) spectral energy.

The pixels of the image sensor may thus receive a first (relatively) wide-aperture image signal 416 associated with visible spectral energy having a limited DOF overlaying a second small-aperture image signal 418 associated with the infrared spectral energy having a large DOF. Objects 420 close to the plane of focus N of the lens are projected onto the image plane with relatively small defocus blur by the visible radiation, while objects 422 further located from the plane of focus are projected onto the image plane with relatively small defocus blur by the infrared radiation. Hence, contrary to conventional imaging systems comprising a single aperture, a dual or a multiple aperture imaging system uses an aperture system comprising two or more apertures of different sizes for controlling the amount and the collimation of radiation in different bands of the spectrum exposing the image sensor.

Figure 5:
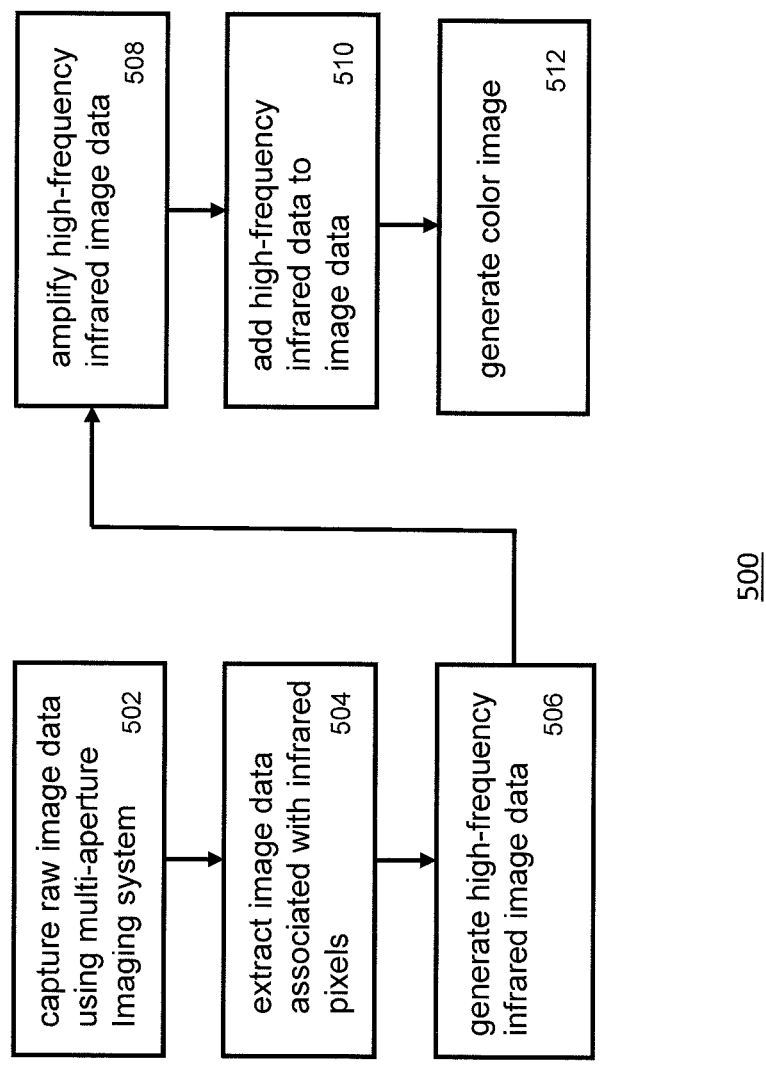
FIG. 5 depicts an image processing method for use with a multi-aperture imaging system according to one embodiment of the invention.

The DSP may be configured to process the captured color and infrared signals. FIG. 5 depicts typical image processing steps 500 for use with a multi-aperture imaging system. In this example, the multi-aperture imaging system comprises a conventional color image sensor using e.g. a Bayer color filter array. In that case, it is mainly the red pixel filters that transmit the infrared radiation to the image sensor. The red color pixel data of the captured image frame comprises both a high-amplitude visible red signal and a sharp, low-amplitude non-visible infrared signal. The infrared component may be 8 to 16 times lower than the visible red component. Further, using known color balancing techniques the red balance may be adjusted to compensate for the slight distortion created by the presence of infrared radiation. In other variants, the an RGBI image sensor may be used wherein the infrared image may be directly obtained by the I-pixels.

In a first step 502 Bayer filtered raw image data are captured. Thereafter, the DSP may extract the red color image data, which also comprises the infrared information (step 504). Thereafter, the DSP may extract the sharpness information associated with the infrared image from the red image data and use this sharpness information to enhance the color image.

One way of extracting the sharpness information in the spatial domain may be achieved by applying a high pass filter to the red image data. A high-pass filter may retain the high frequency information (high frequency components) within the red image while reducing the low frequency information (low frequency components). The kernel of the high pass filter may be designed to increase the brightness of the centre pixel relative to neighbouring pixels. The kernel array usually contains a single positive value at its centre, which is completely surrounded by negative values. A simple non-limiting example of a 3×3 kernel for a high-pass filter may look like:

|−1/9 −1/9 −1/9|
|−1/9 8/9 −1/9|
|/1/9 −1/9 −1/9|

Hence, the red image data are passed through a high-pass filter (step 506) in order to extract the high-frequency components (i.e. the sharpness information) associated with the infrared image signal.

As the relatively small size of the infrared aperture produces a relatively small infrared image signal, the filtered high-frequency components are amplified in proportion to the ratio of the visible light aperture relative to the infrared aperture (step 508).

The effect of the relatively small size of the infra-red aperture is partly compensated by the fact that the band of infrared radiation captured by the red pixel is approximately four times wider than the band of red radiation (typically a digital infra-red camera is four times more sensitive than a visible light camera). After amplification, the amplified high-frequency components derived from the infrared image signal are added to (blended with) each color component of the Bayer filtered raw image data (step 510). This way the sharpness information of the infrared image data is added to the color image. Thereafter, the combined image data may be transformed into a full RGB color image using a demosaicking algorithm well known in the art (step 512).

In a variant (not shown) the Bayer filtered raw image data are first demosaicked into a RGB color image and subsequently combined with the amplified high frequency components by addition (blending).

The method depicted in FIG. 5 allows the multi-aperture imaging system to have a wide aperture for effective operation in lower light situations, while at the same time to have a greater DOF resulting in sharper pictures. Further, the method effectively increase the optical performance of lenses, reducing the cost of a lens required to achieve the same performance.

The multi-aperture imaging system thus allows a simple mobile phone camera with a typical f-number of 7 (e.g. focal length N of 7 mm and a diameter of 1 mm) to improve its DOF via a second aperture with a f-number varying e.g. between 14 for a diameter of 0.5 mm up to 70 or more for diameters equal to or less than 0.2 mm, wherein the f-number is defined by the ratio of the focal length f and the effective diameter of the aperture. Preferable implementations include optical systems comprising an f-number for the visible radiation of approximately 2 to 4 for increasing the sharpness of near objects in combination with an f-number for the infrared aperture of approximately 16 to 22 for increasing the sharpness of distance objects.

The improvements in the DOF and the ISO speed provided by a multi-aperture imaging system are described in more detail in related applications PCT/EP2009/050502 and PCT/EP2009/060936. In addition, the multi-aperture imaging system as described with reference to FIG. 1-5, may be used for generating depth information associated with a single captured image. More in particular, the DSP of the multi-aperture imaging system may comprise at least one depth function, which depends on the parameters of the optical system and which in one embodiment may be determined in advance by the manufacturer and stored in the memory of the camera for use in digital image processing functions.

An image may contain different objects located at different distances from the camera lens so that objects closer to the focal plane of the camera will be sharper than objects further away from the focal plane. A depth function may relate sharpness information associated with objects imaged in different areas of the image to information relating to the distance from which these objects are removed from the camera. In one embodiment, a depth function R may involve determining the ratio of the sharpness of the color image components and the infrared image components for objects at different distances away from the camera lens. In another embodiment, a depth function D may involve autocorrelation analyses of the high-pass filtered infrared image. These embodiments are described hereunder in more detail with reference to FIG. 6-14.

In a first embodiment, a depth function R may be defined by the ratio of the sharpness information in the color image and the sharpness information in the infrared image. Here, the sharpness parameter may relate to the so-called circle of confusion, which corresponds to the blur spot diameter measured by the image sensor of an unsharply imaged point in object space. The blur disk diameter representing the defocus blur is very small (zero) for points in the focus plane and progressively grows when moving away to the foreground or background from this plane in object space. As long as the blur disk is smaller than the maximal acceptable circle of confusion c, it is considered sufficiently sharp and part of the DOF range. From the known DOF formulas it follows that there is a direct relation between the depth of an object, i.e. its distance s from the camera, and the amount of blur (i.e. the sharpness) of that object in the camera.

Hence, in a multi-aperture imaging system, the increase or decrease in sharpness of the RGB components of a color image relative to the sharpness of the IR components in the infrared image depends on the distance of the imaged object from the lens. For example, if the lens is focused at 3 meters, the sharpness of both the RGB components and the IR components may be the same. In contrast, due to the small aperture used for the infrared image for objects at a distance of 1 meter, the sharpness of the RGB components may be significantly less than those of the infra-red components. This dependence may be used to estimate the distances of objects from the camera lens.

In particular, if the lens is set to a large ("infinite") focus point (this point may be referred to as the hyperfocal distance H of the multi-aperture system), the camera may determine the points in an image where the color and the infrared components are equally sharp. These points in the image correspond to objects, which are located at a relatively large distance (typically the background) from the camera. For objects located away from the hyperfocal distance H, the relative difference in sharpness between the infrared components and the color components will increase as a function of the distance s between the object and the lens. The ratio between the sharpness information in the color image and the sharpness information in the infrared information measured at one spot (e.g. one or a group of pixels) will hereafter be referred to as the depth function R(s).

Figure 6A:
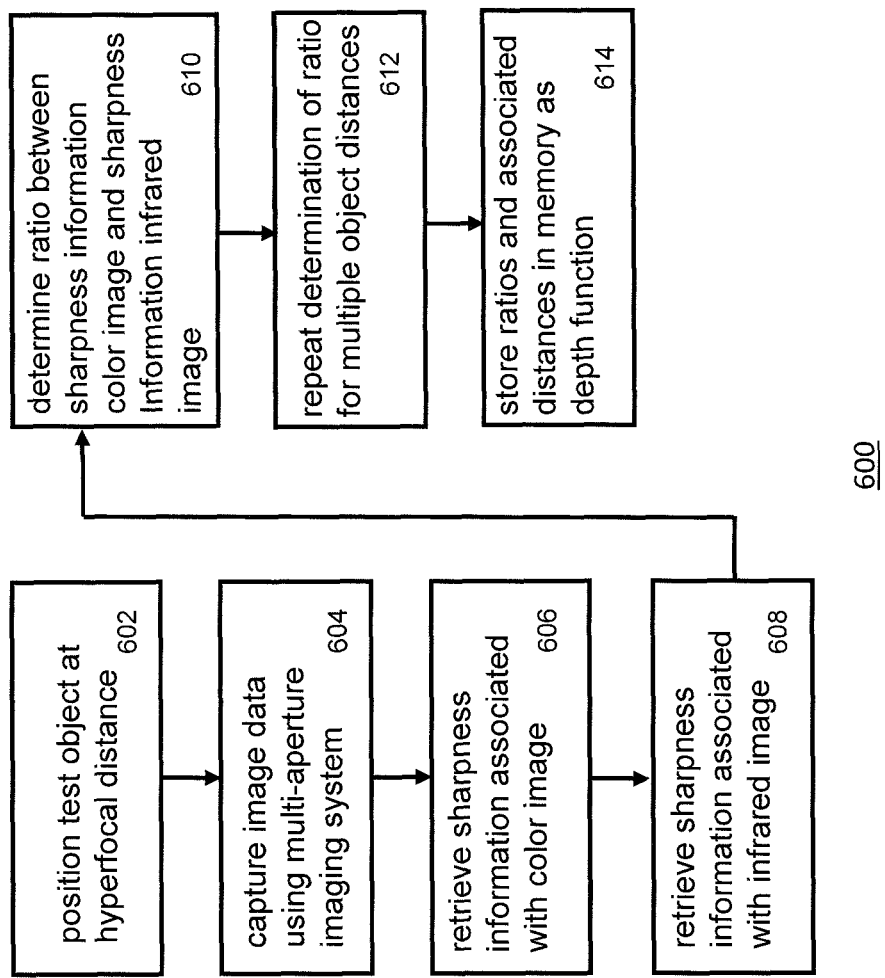
FIG. 6A depicts a method for determining of a depth function according to one embodiment of the invention.

The depth function R(s) may be obtained by measuring the sharpness ratio for one or more test objects at different distances s from the camera lens, wherein the sharpness is determined by the high frequency components in the respective images. FIG. 6A depicts a flow diagram 600 associated with the determination of a depth function according to one embodiment of the invention. In a first step 602, a test object may be positioned at least at the hyperfocal distance H from the camera. Thereafter, image data are captured using the multi-aperture imaging system. Then, sharpness information associated with a color image and infrared information is extracted from the captured data (steps 606-608). The ratio between the sharpness information R(H) is subsequently stored in a memory (step 610). Then the test object is moved over a distance Δ away from the hyperfocal distance H and R is determined at this distance. This process is repeated until R is determined for all distances up to close to the camera lens (step 612). These values may be stored into the memory. Interpolation may be used in order to obtain a continuous depth function R(s) (step 614).

In one embodiment, R may be defined as the ratio between the absolute value of the high-frequency infrared components $D_{ir}$ and the absolute value of the high-frequency color components $D_{col}$ measured at a particular spot in the image. In another embodiment, the difference between the infrared and color components in a particular area may be calculated. The sum of the differences in this area may then be taken as a measure of the distance.

Figure 6B:
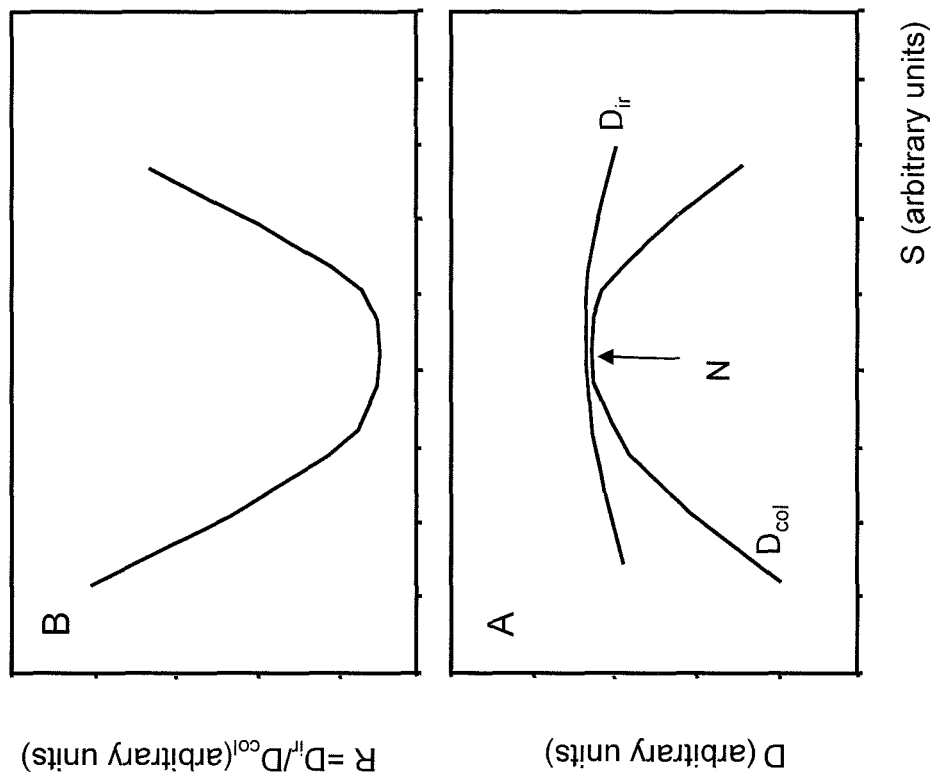
FIG. 6B depicts a schematic of a depth function and graph depicting high-frequency color and infrared information as a function of distance.

FIG. 6B depicts a plot of $D_{col}$ and $D_{ir}$ as a function of distance (graph A) and a plot of $R=D_{ir}/D_{col}$ as a function of distance (graph B). In graph A it shown that around the focal distance N the high-frequency color components have the highest values and that away from the focal distance high-frequency color components rapidly decrease as a result of blurring effects. Further, as a result of the relatively small infrared aperture, the high-frequency infrared components will have relatively high values over a large distance away from the focal point N.

Figure 7:
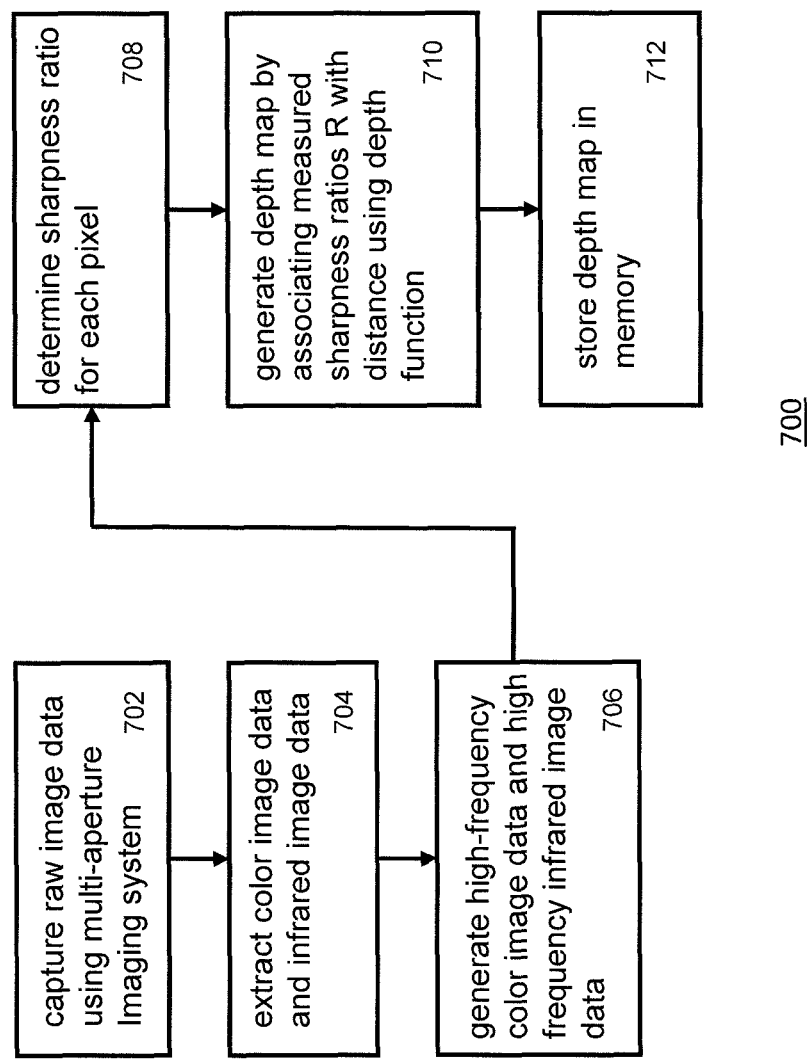
FIG. 7 depicts a method for generating a depth map according to one embodiment of the invention.

Graph B depicts the resulting depth function R defined as the ratio between $D_{ir}/D_{col}$, indicating that for distances substantially larger than the focal distance N the sharpness information is comprised in the high-frequency infrared image data. The depth function R(s) may be obtained by the manufacturer in advance and may be stored in the memory of the camera, where it may be used by the DSP in one or more post-processing functions for processing an image captured by the multi-aperture imaging system. In one embodiment one of the post-processing functions may relate to the generation of a depth map associated with a single image captured by the multi-aperture imaging system. FIG. 7 depicts a schematic of a process for generating such depth map according to one embodiment of the invention. After the image sensor in the multi-aperture imaging system captures both visible and infrared image signals simultaneously in one image frame (step 702), the DSP may separate the color and infrared pixel signals in the captured raw mosaic image using e.g. a known demosaicking algorithm (step 704). Thereafter, the DSP may use a high-pass filter on the color image data (e.g. an RGB image) and the infrared image data in order to obtain the high frequency components of both image data (step 706).

Thereafter, the DSP may associate a distance to each pixel p(i,j) or a group of pixels. To that end, the DSP may determine for each pixel p(I,j) the sharpness ratio R(i,j) between the high frequency infrared components and the high frequency color components: $R(i,j)=D_{ir}(i,j)/D_{col}(i,j)$ (step 708). On the basis of depth function R(s), in particular the inverse depth function R'(R), the DSP may then associate the measured sharpness ratio R(i,j) at each pixel with a distance s(i,j) to the camera lens (step 710). This process will generate a distance map wherein each distance value in the map is associated with a pixel in the image. The thus generated map may be stored in a memory of the camera (step 712).

Assigning a distance to each pixel may require large amount of data processing. In order to reduce the amount of computation, in one variant, in a first step edges in the image may be detected using a well known edge-detection algorithm. Thereafter, the areas around these edges may be used as sample areas for determining distances from the camera lens using the sharpness ration R in these areas. This variant provides the advantage that it requires less computation.

Hence, on the basis of an image, i.e. a pixel frame $\{p(i,j)\}$, captured by a multi-aperture camera system, the digital imaging processer comprising the depth function may determine an associated depth map $\{s(i,j)\}$. For each pixel in the pixel frame the depth map comprises an associated distance value. The depth map may be determined by calculating for each pixel $p(i,j)$ an associated depth value $s(i,j)$. Alternatively, the depth map may be determined by associating a depth value with groups of pixels in an image. The depth map may be stored in the memory of the camera together with the captured image in any suitable data format.

The process is not limited to the steps described with reference to FIG. 7. Various variants are possible without departing from the invention. For example, of the high-pass filtering may applied before the demosaicking step. In that case, the high-frequency color image is obtained by demosaicking the high-pass filtered image data.

Further, other ways of determining the distance on the basis of the sharpness information are also possible without departing from the invention. For example instead of analyzing sharpness information (i.e. edge information) in the spatial domain using e.g. a high-pass filter, the sharpness information may also be analyzed in the frequency domain. For example in one embodiment, a running Discrete Fourier Transform (DFT) may be used in order obtain sharpness information. The DFT may be used to calculate the Fourier coefficients of both the color image and the infrared image. Analysis of these coefficients, in particular the high-frequency coefficient, may provide an indication of distance.

For example, in one embodiment the absolute difference between the high-frequency DFT coefficients associated with a particular area in the color image and the infrared image may be used as an indication for the distance. In a further embodiment, the Fourier components may used for analyzing the cutoff frequency associated with infrared and the color signals. For example if in a particular area of the image the cutoff frequency of the infrared image signals is larger than the cutoff frequency of the color image signal, then this difference may provide an indication of the distance.

Figure 8:
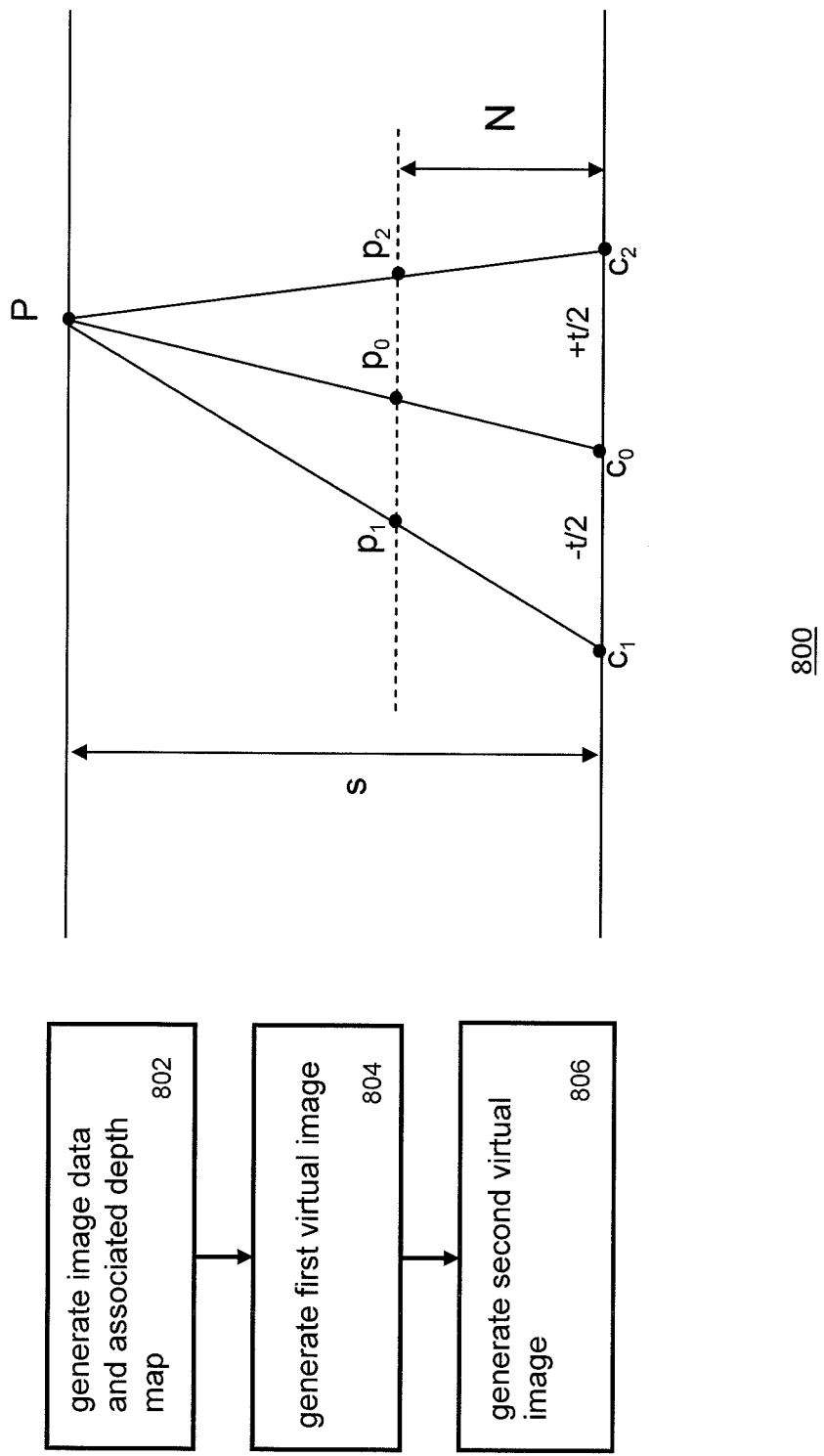
FIG. 8 depicts a method for obtaining a stereoscopic view according to one embodiment of the invention.

On the basis of the depth map various image-processing functions be realized. FIG. 8 depicts a scheme 800 for obtaining a stereoscopic view according to one embodiment of the invention. On the basis of the original camera position $C_0$ positioned at a distance s from an object P, two virtual camera positions $C_1$ and $C_2$ (one for the left eye and one for the right eye) may be defined. Each of these virtual camera positions are symmetrically displaced over a distance $-t/2$ and $+t/2$ with respect to an original camera position. Given the geometrical relation between the focal length N, $C_0$, $C_1$, $C_2$, t and s, the amount of pixel shifting required to generate the two shifted "virtual" images associated with the two virtual camera positions may be determined by the expressions:

$$P_1 = p_0 - (t*N)/(2s) \text{ and } P_2 = p0 + (t*N)/(2s);$$

Hence, on the basis of these expressions and the distance information $s(i,j)$ in the depth map, the image processing function may calculate for each pixel $p_0(i,j)$ in the original image, pixels $p_1(i,j)$ and $p_2(i,j)$ associated with the first and second virtual image (steps 802-806). This way each pixel $p_0(i,j)$ in the original image may be shifted in accordance with the above expressions generating two shifted images $\{p_1(i,j)\}$ and $\{p_2(i,j)\}$ suitable for stereoscopic viewing.

Figure 9:
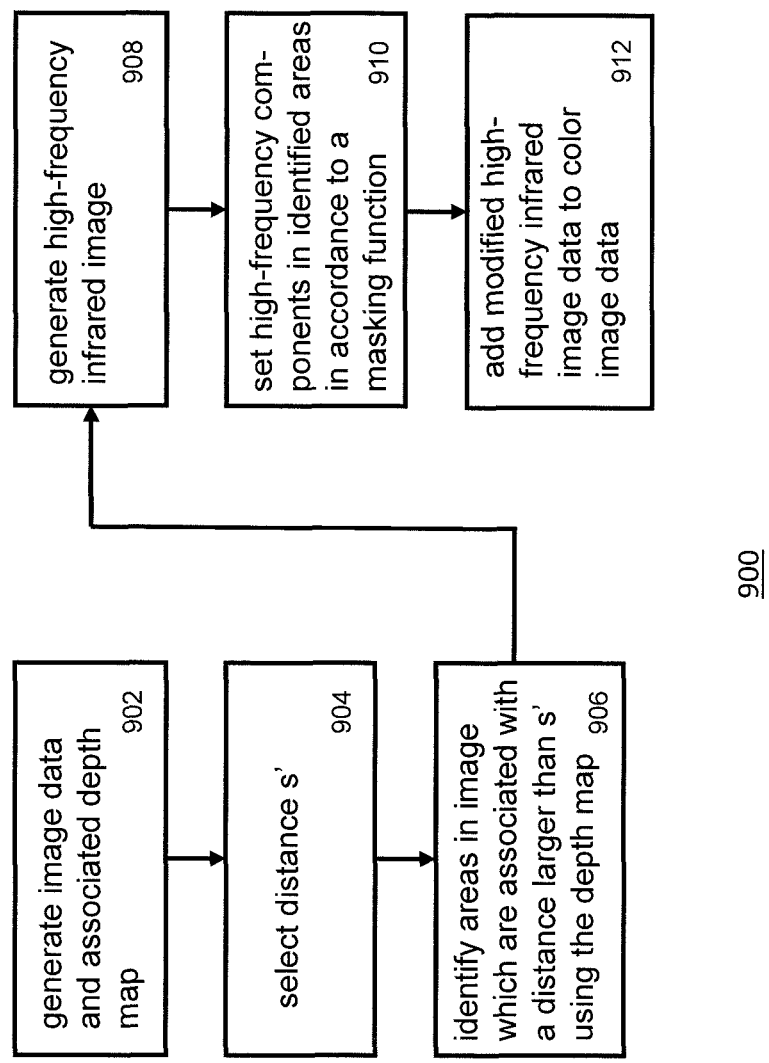
FIG. 9 depicts a method for controlling the depth of field according to one embodiment of the invention.

FIG. 9 depicts a further image processing function 900 according to one embodiment. This function allows controlled reduction of the DOF in the multi-aperture imaging system. As the multi-aperture imaging system uses a fixed lens and a fixed multi-aperture system, the optical system delivers images with a fixed (improved) DOF of the optical system. In some circumstances however, it may be desired to have a variable DOF.

In a first step 902 image data and an associated depth map may be generated. Thereafter, the function may allow selection of a particular distance s' (step 904) which may be used as a cut-off distance after which the sharpness enhancement on the basis of the high frequency infrared components should be discarded. Using the depth map, the DSP may identified first areas in an image, which are associated with at an object-to-camera distance larger than the selected distance s' (step 906) and second areas, which are associated with an object-to-camera distance smaller than the selected distance s'. Thereafter, the DSP may retrieve the high-frequency infrared image and set the high-frequency infrared components in the identified first areas to a value according to a masking function (step 910). The thus modified high frequency infrared image may then be blended (step 912) with the RGB image in a similar way as depicted in FIG. 5. That way an RGB image may be obtained wherein the objects in the image which up to a distance s' away from the camera lens are enhanced with the sharpness information obtained from the high-frequency infrared components. This way, the DOF may be reduced in a controlled way.

It is submitted that various variants are possible without departing from the invention. For example, instead of a single distance, a distance range [s1, s2] may be selected by the user of the multi-aperture system. Objects in an image may be related to distances away form the camera. Thereafter, the DSP may determine which object areas are located within this range. These areas are subsequently enhanced by the sharpness information in the high-frequency components.

Figure 10:
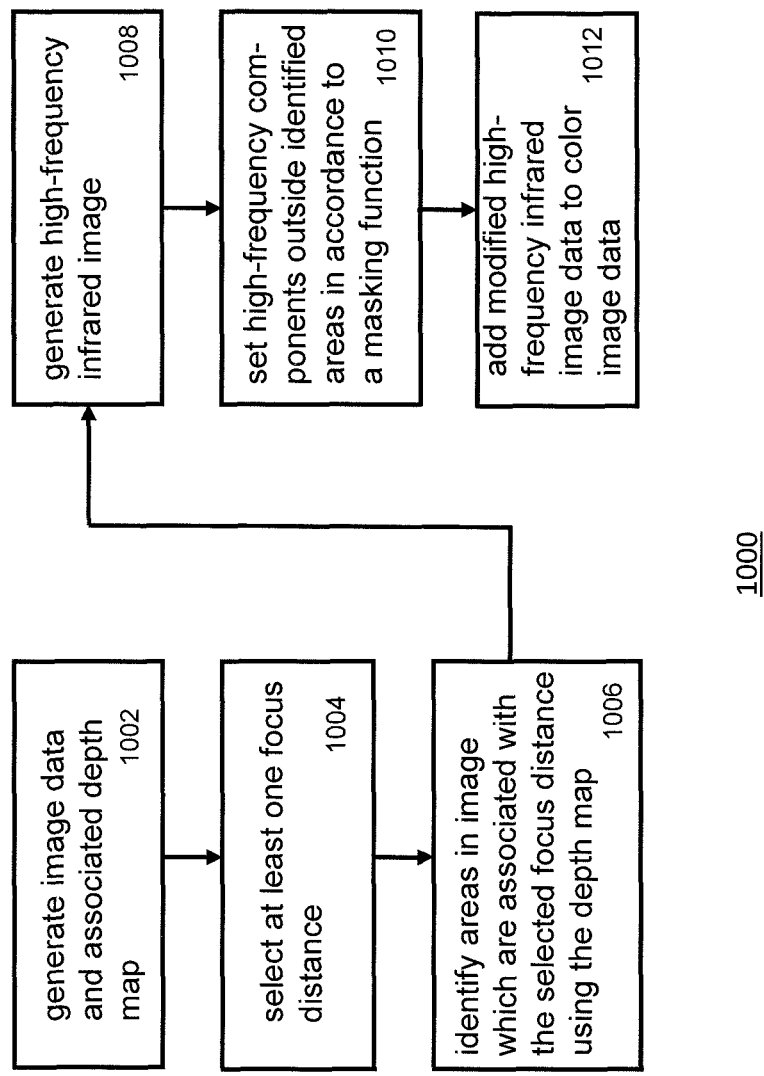
FIG. 10 depicts a method for controlling the focus point according to one embodiment of the invention.

Yet a further image processing function may relate to controlling the focus point of the camera. This function is schematically depicted in FIG. 10. In this embodiment, a (virtual) focus distance N' may be selected (step 1004). Using the depth map, the areas in the image associated with this selected focus distance may be determined (step 1006). Thereafter, the DSP may generate a high-frequency infrared image (step 1008) and set all high-frequency components outside the identified areas to a value according to a masking function (step 1010). The thus modified high-frequency infrared image may be blended with the RGB image (step 1012), thereby only enhancing the sharpness in the areas in the image associated with the focus distance N'. This way, the focus point in the image may be varied in a controllable way.

Further variants of controlling the focus distance may include selection of multiple focus distances N',N", etc. For each of these elected distances the associated high-frequency components in the infrared image may be determined. Subsequent modification of the high-frequency infrared image and blending with the color image in a similar way as described with reference to FIG. 10 may result in an image having e.g. an object at 2 meters in focus, an object at 3 meters out-of-focus and an object at 4 meters in focus. In yet another embodiment, the focus control as described with reference to FIGS. 9 and 10 may be applied to one or more particular areas in an image. To that end, a user or the DSP may select one or more particular areas in an image in which focus control is desired.

In yet another embodiment, the distance function R(s) and/or depth map may be used for processing said captured image using a known image processing function (e.g. filtering, blending, balancing, ect.), wherein one or more image process function parameters associated with such function are depending on the depth information. For example, in one embodiment, the depth information may be used for controlling the cut-off frequency and/or the roll-off of the high-pass filter that is used for generating a high-frequency infrared image. When the sharpness information in the color image and the infrared image for a certain area of the image are substantially similar, less sharpness information (i.e. high-frequency infrared components) of the infrared image is required. Hence, in that case a high-pass filter having very high cut-off frequency may be used. In contrast, when the sharpness information in the color image and the infrared image are different, a high-pass filter having lower cut-off frequency may be used so that the blur in the color image may be compensated by the sharpness information in the infrared image. This way, throughout the image or in specific part of the image, the roll-off and/or the cut-off frequency of the high-pass filter may be adjusted according to the difference in the sharpness information in the color image and the infrared image.

The generation of a depth map and the implementation of image processing functions on the basis of such depth map are not limited to the embodiments above.

Figure 11:
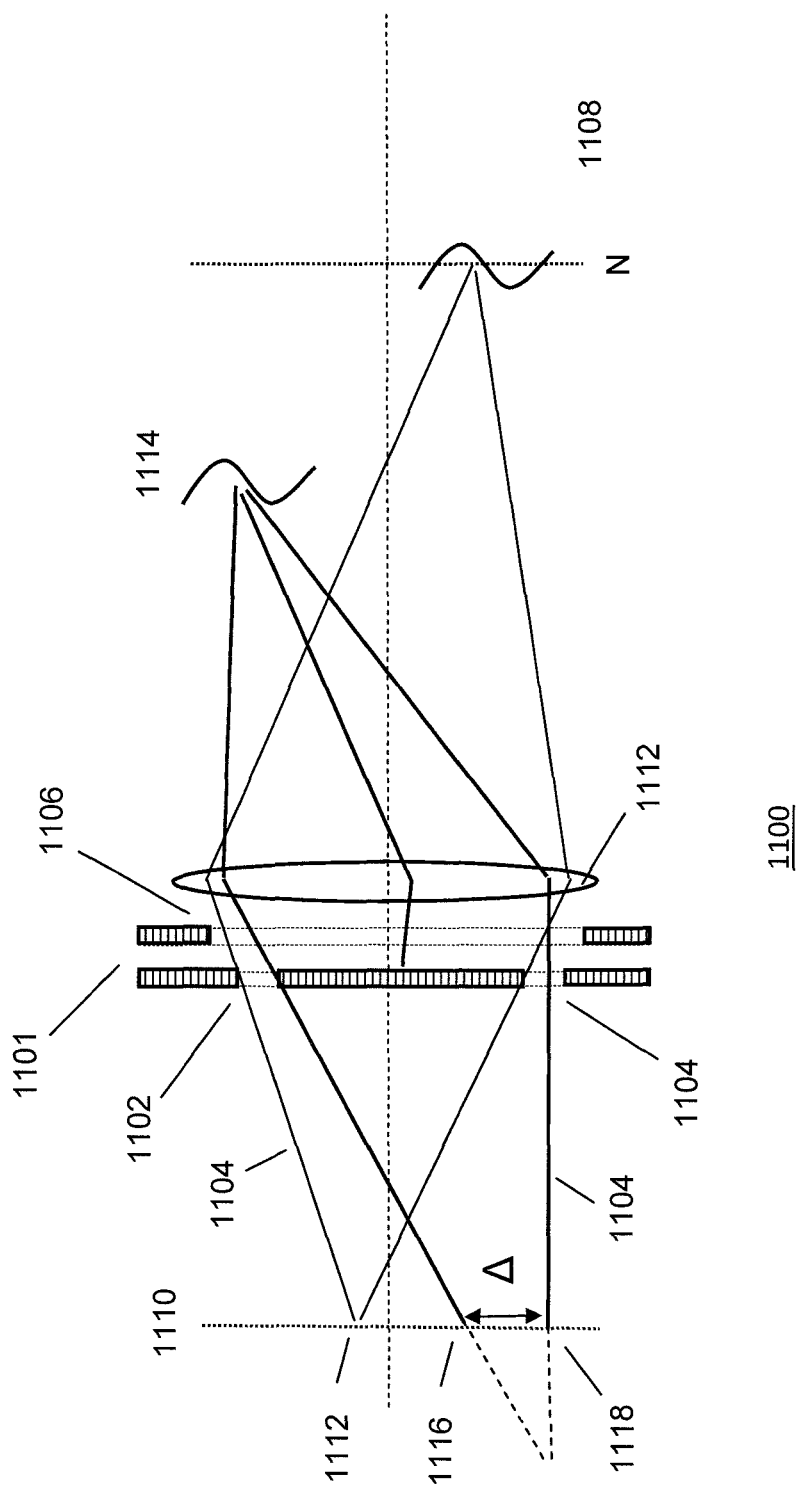
FIG. 11 depicts an optical system using a multi-aperture system according to another embodiment of the invention.

FIG. 11 depicts a schematic of a multi-aperture imaging system 1100 for generating a depth information according to further embodiment. In this embodiment, the depth information is obtained through use of a modified multi-aperture configuration. Instead of one infrared aperture in the center as e.g. depicted in FIG. 4, the multi-aperture 1101 in FIG. 11 comprises multiple, (i.e. two or more) small infrared apertures 1102,1104 at the edge (or along the periphery) of the stop forming the larger color aperture 1106. These multiple small apertures are substantially smaller than the single infrared aperture as depicted in FIG. 4, thereby providing the effect that an object 1108 that is in focus is imaged onto the imaging plane 1110 as a sharp single infrared image 1112. In contrast, an object 1114 that is out-of-focus is imaged onto the imaging plane as two infrared images 1116,1118. A first infrared image 1116 associated with a first infrared aperture 1102 is displaced over a particular distance Δ with respect to a second infrared image 1118 associated with a second infrared aperture. Instead of a continuously blurred image normally associated with an out-of-focus lens, the multi-aperture comprising multiple small infrared apertures allows the formation of discrete, sharp images. When compared with a single infrared aperture, the use of multiple infrared apertures allows the use of smaller apertures thereby achieving further enhancement of the depth of field. The further the object is out of focus, the larger the distance Δ over which the images as displaced. Hence, the displacement distance Δ between the two imaged infrared images is a function of the distance between the object and the camera lens and may be used for determining a depth function Δ(s).

The depth function Δ(s) may be determined by imaging a test object at multiple distances from the camera lens and measuring Δ at those different distances. Δ(s) may be stored in the memory of the camera, where it may be used by the DSP in one or more post-processing functions as discussed hereunder in more detail.

In one embodiment one post-processing functions may relate to the generation of a depth information associated with a single image captured by the multi-aperture imaging system comprising a discrete multiple-aperture as described with reference to FIG. 11. After simultaneously capturing both visible and infrared image signals in one image frame, the DSP may separate the color and infrared pixel signals in the captured raw mosaic image using e.g. a known demosaicking algorithm. The DSP may subsequently use a high pass filter on the infrared image data in order to obtain the high frequency components of infrared image data, which may comprise areas where objects are in focus and areas where objects are out-of-focus.

Figure 12:
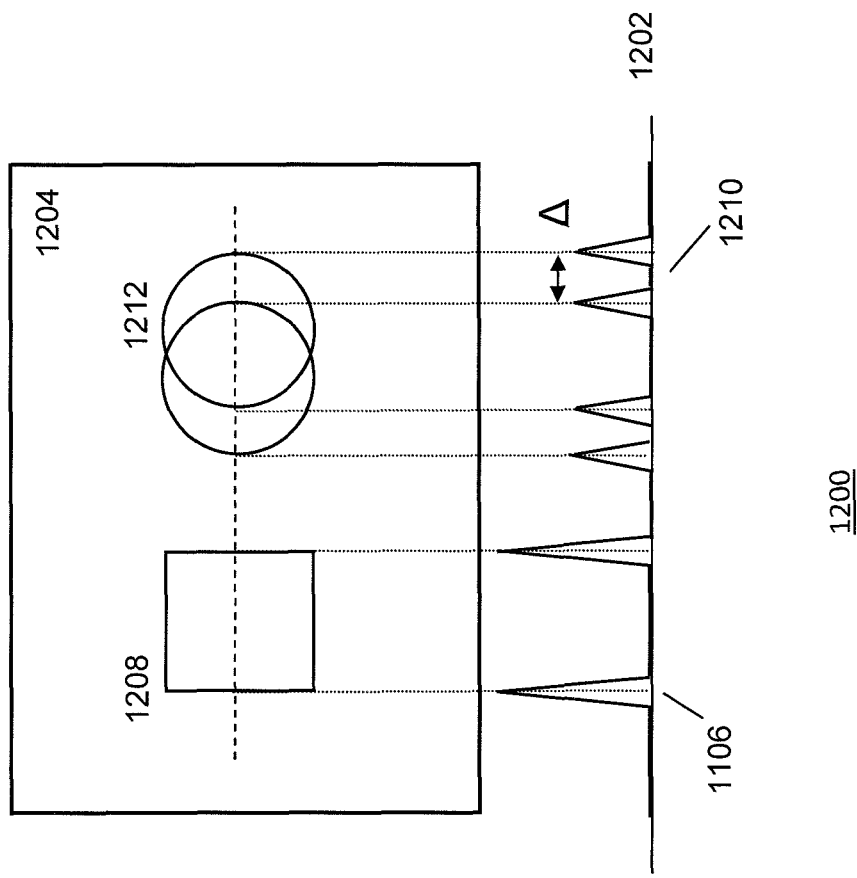
FIG. 12 depicts a method for determining a depth function according to another embodiment of the invention.

Further, the DSP may derive depth information from the high-frequency infrared image data using an autocorrelation function. This process is schematically depicted in FIG. 12. When taking the autocorrelation function 1202 of (part of) the high-frequency infrared image 1204, a single spike 1206 will appear at the high-frequency edges of an imaged object 1208 that is in focus. In contrast, the autocorrelation function will generate a double spike 1210 at the high frequency edges of an imaged object 1212 that is out-of-focus. Here the shift between the spikes represents the shift Δ between the two high-frequency infrared images, which is dependent on the distance s between the imaged object and the camera lens.

Hence, the auto-correlation function of (part of) the high-frequency infrared image, will comprise double spikes at locations in the high-frequency infrared image where objects are out-of-focus and wherein the distance between the double spike provides a distance measure (i.e. a distance away from the focal distance). Further, the auto-correlation function will comprise a single spike at locations in the image where objects are in focus. The DSP may process the autocorrelation function by associating the distance between the double spikes to a distance using the predetermined depth function a(s) and transform the information therein into a depth map associated with "real distances".

Using the depth map similar functions, e.g. stereoscopic viewing, control of DOF and focus point may be performed as described above with reference to FIG. 8-10. For example, Δ(s) or the depth map may be used to select high-frequency components in the infrared image which are associated with a particular selected camera-to-object distance.

Figure 13:
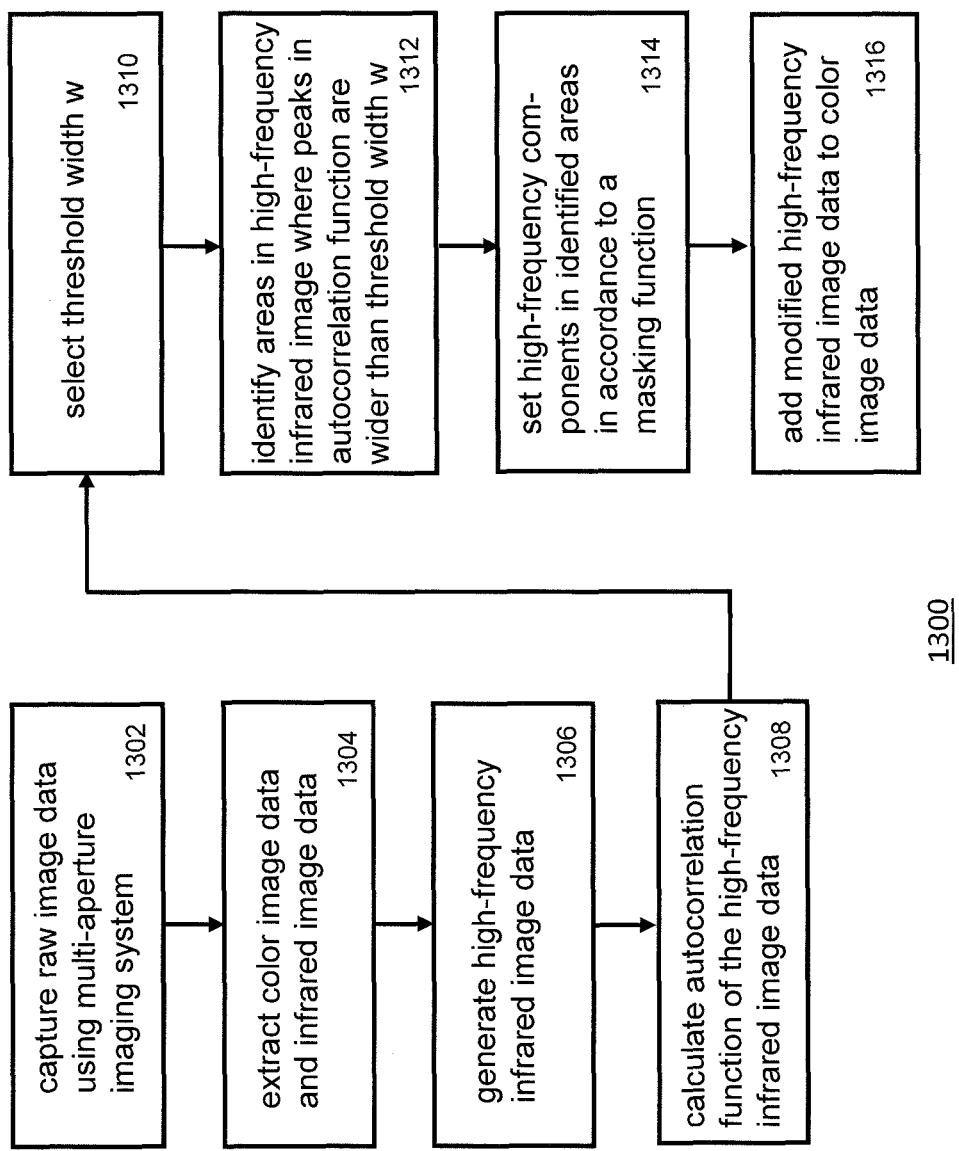
FIG. 13 depicts a method for controlling the depth of field according to another embodiment of the invention.

Certain image processing functions may be achieved by analyzing the autocorrelation function of the high-frequency infrared image. FIG. 13 depicts for example a process 1300 wherein the DOF is reduced by comparing the width of peaks in the autocorrelation function with a certain threshold width. In a first step 1302 an image is captured using a multi-aperture imaging system as depicted in FIG. 11, color and infrared image data are extracted (step 1304) and a high-frequency infrared image data is generated (step 1306). Thereafter, an autocorrelation function of the high-frequency infrared image data is calculated (step 1308). Further, a threshold width w is selected (step 1310). If a peak in the autocorrelation function associated with a certain imaged object is narrower than the threshold width, the high-frequency infrared components associated with that peak in the autocorrelation function are selected for combining with the color image data. If peaks or the distance between two peaks in the autocorrelation function associated with an edge of certain imaged object are wider than the threshold width, the high-frequency components associated with that peak in the correlation function are set in accordance with a masking function (steps 1312-1314). Thereafter, the thus modified high-frequency infrared image is processed using standard image processing techniques in order to eliminate the shift Δ introduced by the multi-aperture so that it may be blended with the color image data (step 1316). After blending a color image is formed a with reduced DOF is formed. This process allows control of the DOF by selecting a predetermined threshold width.

Figure 14:
FIG. 14 depicts multi-aperture systems for use in multi-aperture imaging system.

FIG. 14 depicts two non-limiting examples 1402,1410 of a multi-aperture for use in a multi-aperture imaging system as described above. A first multi-aperture 1402 may comprise a transparent substrate with two different thin-film filters: a first circular thin-film filter 1404 in the center of the substrate forming a first aperture transmitting radiation in a first band of the EM spectrum and a second thin-film filter 1406 formed (e.g. in a concentric ring) around the first filter transmitting radiation in a second band of the EM spectrum.

The first filter may be configured to transmit both visible and infrared radiation and the second filter may be configured to reflect infrared radiation and to transmit visible radiation. The outer diameter of the outer concentric ring may be defined by an opening in an opaque aperture holder 1408 or, alternatively, by the opening defined in an opaque thin film layer 1408 deposited on the substrate which both blocks infra-read and visible radiation. It is clear for the skilled person that the principle behind the formation of a thin-film multi-aperture may be easily extended to a multi-aperture comprising three or more apertures, wherein each aperture transmits radiation associated with a particular band in the EM spectrum.

In one embodiment the second thin-film filter may relate to a dichroic filter which reflects radiation in the infra-red spectrum and transmits radiation in the visible spectrum. Dichroic filters also referred to as interference filters are well known in the art and typically comprise a number of thin-film dielectric layers of specific thicknesses which are configured to reflect infra-red radiation (e.g. radiation having a wavelength between approximately 750 to 1250 nanometers) and to transmit radiation in the visible part of the spectrum.

A second multi-aperture 1410 may be used in a multi-aperture system as described with reference to FIG. 11. In this variant, the multi-aperture comprises a relatively large first aperture 1412 defined as an opening in an opaque aperture holder 1414 or, alternatively, by the opening defined in an opaque thin film layer deposited on a transparent substrate, wherein the opaque thin-film both blocks infra-read and visible radiation. In this relatively large first aperture, multiple small infrared apertures 1416-1422 are defined as openings in a thin-film hot mirror filter 1424, which is formed within the first aperture.

The multiple small infrared apertures with respect to each other such that high-frequency information (i.e. edge-information) in image data obtained via these apertures is displaced as a function of the distance between an object and said imaging system. In one embodiment multi apertures may be located as multiple small infrared apertures along the periphery of the first aperture.

Embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A method for processing multi-aperture image data, comprising:

capturing image data associated with one or more objects by simultaneously exposing a one pixel array of an image sensor in an imaging system to spectral energy of a visible part of the electromagnetic spectrum using at least a first static aperture and to spectral energy associated with a non-visible part of the electromagnetic spectrum using at least a second and third static aperture; wherein the second and third aperture are smaller than the first aperture; the at least second and third aperture being positioned with respect to each other such that the at least second and third aperture image an object that is out-of-focus as at least two displaced non-visible images onto the image sensor;

generating visible image data associated with said visible part of the electromagnetic spectrum and invisible image data associated with said non-visible part of the electromagnetic spectrum;

generating depth information associated with said generated visible image data on the basis of displacement information in said invisible image data, wherein said at least second and third apertures are positioned with respect to each other such that a first part of said invisible image data obtained via said second aperture and a second part of said invisible image data obtained via said third aperture are displaced with respect to each other according to a function of the distance between an object and said imaging system; wherein the generating depth information includes:

identifying one or more edges of at least two non-visible images of at least one object of the one or more objects in the image data;

determining a distance between said imaging system and the at least one object on the basis of said one or more identified edges.

2. The method according to claim 1, further comprising:

determining high-frequency invisible image data by subjecting said invisible image data to a high-pass filter; and/or eliminating displacements in said high-frequency invisible image data generated by said second and third apertures.

3. The method according to claim 1, comprising:

generating a depth map associated with at least part of said captured image by associating displacement information in said invisible image data with a distance between said imaging system and at least one of said objects.

4. The method according to claim 1, comprising:
generating at least one image for use in stereoscopic viewing by shifting pixels in said visible image data on the basis of said depth information.

5. The method according to claim 1, further comprising:
providing at least one threshold distance or at least one distance range;
on the basis of said depth information, identifying in high-frequency invisible image data one or more areas associated with distances larger or smaller than said threshold distance or identifying in said high-frequency invisible image data one or more areas associated with distances within said at least one distance range;
setting the high-frequency components in said identified one or more areas of said second high-frequency image data to zero or to one or more predetermined values;
adding said second high-frequency image data to said visible image data.

6. The method according to claim 1, comprising:
providing at least one focus distance;
on the basis of said depth information, identifying in high-frequency invisible image data one or more areas associated with a distance equal to said at least one focus distance;
setting the high-frequency invisible image data in areas other than said identified one or more areas to zero or to one or more predetermined values;
adding said high-frequency invisible image data to said visible image data.

7. The method according to claim 1, comprising:
processing said captured image using an image processing function, wherein one or more image process function parameters are depending on said depth information.

8. The method according to claim 7, wherein processing said captured image using an image processing function comprises processing said invisible image data by applying a filter, wherein one or more filter parameters vary in accordance with said depth information.

9. The method according to claim 1, wherein the non-visible spectrum is the infrared spectrum.

10. The method according to claim 1, wherein the edge of an object is determined on the basis of the high-frequency information in the invisible image data.

11. The method according to claim 10, further comprising:
identifying one or more peaks in one or more areas of said auto-correlated high-frequency image data associated with said second image data, wherein said one or more peaks are associated with edges of imaged objects;
on the basis of said one or more identified peaks determining a distance between said imaging system and at least one of said objects.

12. The method according to claim 11, further comprising:
identifying a single peak associated with an edge of an imaged object that is in focus and/or identifying double or multiple peaks associated with an imaged object that is out-of-focus;
relating said single peaks and/or the distance between peaks in said double or multiple peaks to a distance between said imaging system and at least one of said objects by using a predetermined depth function.

13. The method according to claim 1 wherein the displacement between the edge of the object in the two non-visible images is determined on the basis of an autocorrelation function and the high-frequency information in said invisible image data.

14. A wavelength-selective multi-aperture system, comprising:
at least a first static aperture to control exposure of one pixel array of an image sensor in an image system to a visible part of the electromagnetic spectrum;
at least a second and third static aperture to control exposure of said one pixel array to a non-visible part of the electromagnetic spectrum;
wherein said second and third apertures are smaller than said first aperture and wherein
the at least second and third aperture being positioned with respect to each other such that the at least second and third aperture image an object that is out-of-focus as at least two displaced images in the non-visible part of the electromagnetic spectrum onto the image sensor, the displacement between the at least two images being a function of the distance between the object and the imaging system.

15. The multi-aperture system according to claim 14, wherein the multi-aperture system is a wavelength-selective multi-aperture system.

16. The multi-aperture system according to claim 14, wherein the multi-aperture system is a diaphragm comprising a wavelength-selective multi-aperture system.

17. A multi-aperture imaging system, comprising:
an image sensor comprising a pixel array configured to capture image data;
an optical lens system;
a wavelength-selective multi-aperture configured to simultaneously expose the pixel array to spectral energy associated with a visible part of the electromagnetic spectrum using at least a first aperture and to spectral energy associated with a non-visible part of the electromagnetic spectrum using at least a second and third aperture, wherein the second and third aperture are smaller than the first aperture; the at least second and third aperture being positioned with respect to each other such that the at least second and third aperture image an object that is out-of-focus as at least two displaced non-visible images onto the image sensor;
a first processing module configured to generate visible image data associated with said visible part of the electromagnetic spectrum and invisible image data associated with said non-visible part of the electromagnetic spectrum; and,
a second processing module configured to generate depth information associated with said captured image on the basis displacement information in said invisible image data, the second processing module configured to identify one or more edges of at least two non-visible images of at least one object of the one or more objects in the image data and determine a distance between said imaging system and the at least one object on the basis of said one or more identified edges.

18. The multi-aperture imaging system according to claim 17, wherein the generation of depth information by the second processing module is performed on the basis of displacement information in an auto-correlation function of the high-frequency image data associated with said invisible image data.

* * * * *